(12) United States Patent
Shibayama et al.

(10) Patent No.: US 9,797,773 B2
(45) Date of Patent: *Oct. 24, 2017

(54) SPECTROSCOPY MODULE AND MANUFACTURING METHOD THEREFOR

(71) Applicant: HAMAMATSU PHOTONICS K.K., Hamamatsu-shi, Shizuoka (JP)

(72) Inventors: Katsumi Shibayama, Hamamatsu (JP); Takafumi Yokino, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 167 days.

This patent is subject to a terminal disclaimer.

(21) Appl. No.: 14/790,784

(22) Filed: Jul. 2, 2015

(65) Prior Publication Data

US 2015/0308894 A1    Oct. 29, 2015

Related U.S. Application Data

(63) Continuation of application No. 13/390,527, filed as application No. PCT/JP2010/063648 on Aug. 11, 2010, now Pat. No. 9,075,193.

(30) Foreign Application Priority Data

Aug. 19, 2009    (JP) .................................. 2009-190340

(51) Int. Cl.
    *G01J 3/28*    (2006.01)
    *G01J 3/18*    (2006.01)
    (Continued)

(52) U.S. Cl.
    CPC . *G01J 3/18* (2013.01); *G01J 3/02* (2013.01); *G01J 3/021* (2013.01); *G01J 3/0202* (2013.01);
    (Continued)

(58) Field of Classification Search
    CPC .......... G01J 3/0259; G01J 3/18; G01J 3/0256; G02B 5/1852
    See application file for complete search history.

(56) References Cited

U.S. PATENT DOCUMENTS

5,159,404 A    10/1992  Bittner
5,812,262 A     9/1998  Ridyard et al.
(Continued)

FOREIGN PATENT DOCUMENTS

EP    2 048 484    4/2009
EP    2 063 238    5/2009
(Continued)

OTHER PUBLICATIONS

U.S. Office Action dated Sep. 19, 2012 that issued in U.S. Appl. No. 13/545,445 including a Double Patenting Rejection on pp. 2-4.
(Continued)

*Primary Examiner* — Michael A Lyons
*Assistant Examiner* — Maurice Smith
(74) *Attorney, Agent, or Firm* — Drinker Biddle & Reath LLP

(57) ABSTRACT

In a spectroscopic module 1, a flange 7 is formed integrally with a diffraction layer 6 along a periphery thereof so as to become thicker than the diffraction layer 6. As a consequence, at the time of releasing a master mold used for forming the diffraction layer 6 and flange 7, the diffraction layer 6 formed along a convex curved surface 3a of a main unit 3 can be prevented from peeling off from the curved surface 3a together with the master mold. A diffraction grating pattern 9 is formed so as to be eccentric with respect to the center of the diffraction layer 6 toward a predetermined side. Therefore, releasing the mold earlier from the opposite side of the diffraction layer 6 than the predetermined side thereof can prevent the diffraction layer 6 from (Continued)

peeling off and the diffraction grating pattern 9 from being damaged.

8 Claims, 7 Drawing Sheets

(51) Int. Cl.
  *G01J 3/02* (2006.01)
  *G02B 5/18* (2006.01)
(52) U.S. Cl.
  CPC ........... *G01J 3/0208* (2013.01); *G01J 3/0256* (2013.01); *G01J 3/0259* (2013.01); *G01J 3/2803* (2013.01); *G02B 5/1814* (2013.01); *G02B 5/1852* (2013.01); *G02B 5/1861* (2013.01)

(56) References Cited

U.S. PATENT DOCUMENTS

| 2002/0060792 | A1 | 5/2002 | Ibsen et al. |
| 2010/0208258 | A1 | 8/2010 | Shibayama et al. |
| 2010/0315633 | A1 | 12/2010 | Shibayama et al. |

FOREIGN PATENT DOCUMENTS

| EP | 2 072 978 | 6/2009 | |
| EP | 2 116 828 | 11/2009 | |
| JP | 4-204401 | 7/1992 | |
| JP | 4-294223 | 10/1992 | |
| JP | 2000-65642 | 3/2000 | |
| JP | 2003-222706 | 8/2003 | |
| JP | 2004-042493 | 2/2004 | |
| JP | 2004-354176 | 12/2004 | |
| JP | 2005-164286 | 6/2005 | |
| JP | 2005-308495 | 11/2005 | |
| JP | 2006-177994 | 7/2006 | |
| JP | 2007-309964 | 11/2007 | |
| JP | 2007-326330 | 12/2007 | |
| JP | 2008-053720 | 3/2008 | |
| JP | 2008-129229 | 6/2008 | |
| JP | 2009-69016 | 4/2009 | |
| JP | 2009-69017 | 4/2009 | |
| JP | 2009-210416 | 9/2009 | |
| TW | 200914805 | 4/2009 | |
| WO | WO 2009/110110 A1 * | 9/2009 | ............ G01J 3/0208 |

OTHER PUBLICATIONS

U.S. Appl. No. 13/545,445, filed Jul. 10, 2012, Shibayama.

* cited by examiner (a)

(b)

(c)

(a)

(b)

SPECTROSCOPY MODULE AND MANUFACTURING METHOD THEREFOR

This is a continuation application of copending application Ser. No. 13/390,527, having a §371 date of Feb. 15, 2012, which is a national stage filing based on PCT International Application No. PCT/JP2010/063648, filed on Aug. 11, 2010. The copending application Ser. No. 13/390,527 is incorporated by reference herein in its entirety.

TECHNICAL FIELD

The present invention relates to a spectroscopic module which disperses and detects light and a method of manufacturing the same.

BACKGROUND ART

Known as a conventional spectroscopic module is one comprising a substrate for transmitting light therethrough, a diffraction grating pattern formed on the substrate, and a reflection layer formed on the diffraction grating pattern (see, for example, Patent Literature 1).

CITATION LIST

Patent Literature

Patent Literature 1: Japanese Patent Application Laid-Open No. 4-204401

SUMMARY OF INVENTION

Technical Problem

For improving reliability in a spectroscopic module such as the one mentioned above, it is very important to stabilize the forming of the diffraction grating pattern. In particular, the diffraction grating pattern has recently been made finer and thinner in order to reduce the size of the spectroscopic module, thus enhancing demands for stabilizing the forming of the diffraction grating pattern.

In view of such circumstances, it is an object of the present invention to provide a spectroscopic module which can stabilize the forming of a diffraction grating pattern and a method of manufacturing the same.

Solution to Problem

For achieving the above-mentioned object, the spectroscopic module in accordance with the present invention comprises a main unit for transmitting therethrough light incident thereon from one side; a spectroscopic unit, disposed on a convex curved surface formed on the other side of the main unit, for dispersing the light incident on the main unit and reflecting the light to the one side of the main unit; and a photodetector, disposed on the one side of the main unit, for detecting the light dispersed by the spectroscopic unit; wherein the spectroscopic unit has a diffraction layer formed along the curved surface, a flange integrally formed with the diffraction layer along a periphery thereof so as to become thicker than the diffraction layer, and a reflection layer formed on the other side of the diffraction layer; and wherein the diffraction layer is formed with a diffraction grating pattern arranged eccentric with respect to a center of the diffraction layer toward a predetermined side.

In this spectroscopic module, a flange is formed integrally with a diffraction layer along a periphery thereof so as to become thicker than the diffraction layer. As a consequence, at the time of releasing a mold used for forming the diffraction layer and flange, for example, the diffraction layer formed along the convex curved surface of the main unit can be prevented from peeling off from the curved surface together with the mold. The diffraction grating pattern is formed so as to be eccentric with respect to the center of the diffraction layer toward a predetermined side. Therefore, releasing the mold earlier from the opposite side of the diffraction layer than the predetermined side thereof (i.e., retarding the release from the diffraction grating pattern exhibiting relatively higher adherence to the mold) at the time of mold release mentioned above can prevent the diffraction layer from peeling off and the diffraction grating pattern from being damaged. Hence, this spectroscopic module can stabilize the forming of the diffraction grating pattern.

Preferably, in the spectroscopic module in accordance with the present invention, the reflection layer is formed like a circle. When the reflection layer is formed on the other side of the diffraction layer, positional deviations in a rotational direction are likely to occur also because of the fact that the spectroscopic unit is formed on the convex curved surface of the main unit, but are absorbed since the reflection layer is formed like a circle. This can reduce individual differences among spectroscopic modules and inhibit sensitivity from fluctuating.

Preferably, in the spectroscopic module in accordance with the present invention, the reflection layer is formed so as to be included in a region formed with the diffraction grating pattern. In this case, no reflection layer exists in a region free of the diffraction grating pattern in the diffraction layer, whereby light having reached the region free of the diffraction grating pattern can be restrained from being reflected into the main unit so as to be detected by the photodetector or become stray light without being dispersed. In addition, light having reached a region which is formed with the diffraction grating pattern but free of the reflection layer is reflected while being slightly dispersed, so as to be detected by the photodetector, whereby the sensitivity can be improved.

Preferably, in this case, a protective layer is formed on the other side of the diffraction layer so as to contain and cover the reflection layer. This allows the protective layer to come into contact with the region formed with the diffraction grating pattern but free of the reflection layer, whereby an anchor effect can prevent the protective layer from peeling off from the diffraction layer.

Preferably, in the spectroscopic module in accordance with the present invention, the diffraction grating pattern reaches over the flange on the predetermined side. This can accurately form the diffraction layer with the diffraction grating pattern up to a boundary with the flange on the predetermined side. This also makes it possible to inspect the state of the diffraction grating pattern easily in the flange.

The method of manufacturing a spectroscopic module in accordance with the present invention is a method of manufacturing the above-mentioned spectroscopic module, the method comprising the steps of mounting a resin material on a convex curved surface formed on the other side of the main unit; pressing a mold against the resin material and curing the resin material so as to form the diffraction layer provided with the diffraction grating pattern and the flange; and releasing the mold from the resin material earlier from the opposite side than the predetermined side.

In this method of manufacturing a spectroscopic module, the flange is integrally formed with the diffraction layer along the periphery thereof so as to become thicker than the diffraction layer at the time of releasing the mold. As a consequence, the diffraction layer formed along the convex curved surface of the main unit can be prevented from peeling off from the curved surface together with the mold. Since the mold is released earlier from the opposite side of the diffraction layer than the predetermined side thereof, the mold release from the diffraction grating pattern exhibiting relatively higher adherence to the mold is relatively retarded. This can prevent the diffraction layer from peeling off and the diffraction grating pattern from being damaged. Hence, this method of manufacturing a spectroscopic module can stabilize the forming of the diffraction grating pattern.

Advantageous Effects of Invention

The present invention can stabilize the forming of a diffraction grating pattern.

DESCRIPTION OF EMBODIMENTS

Figure 1:
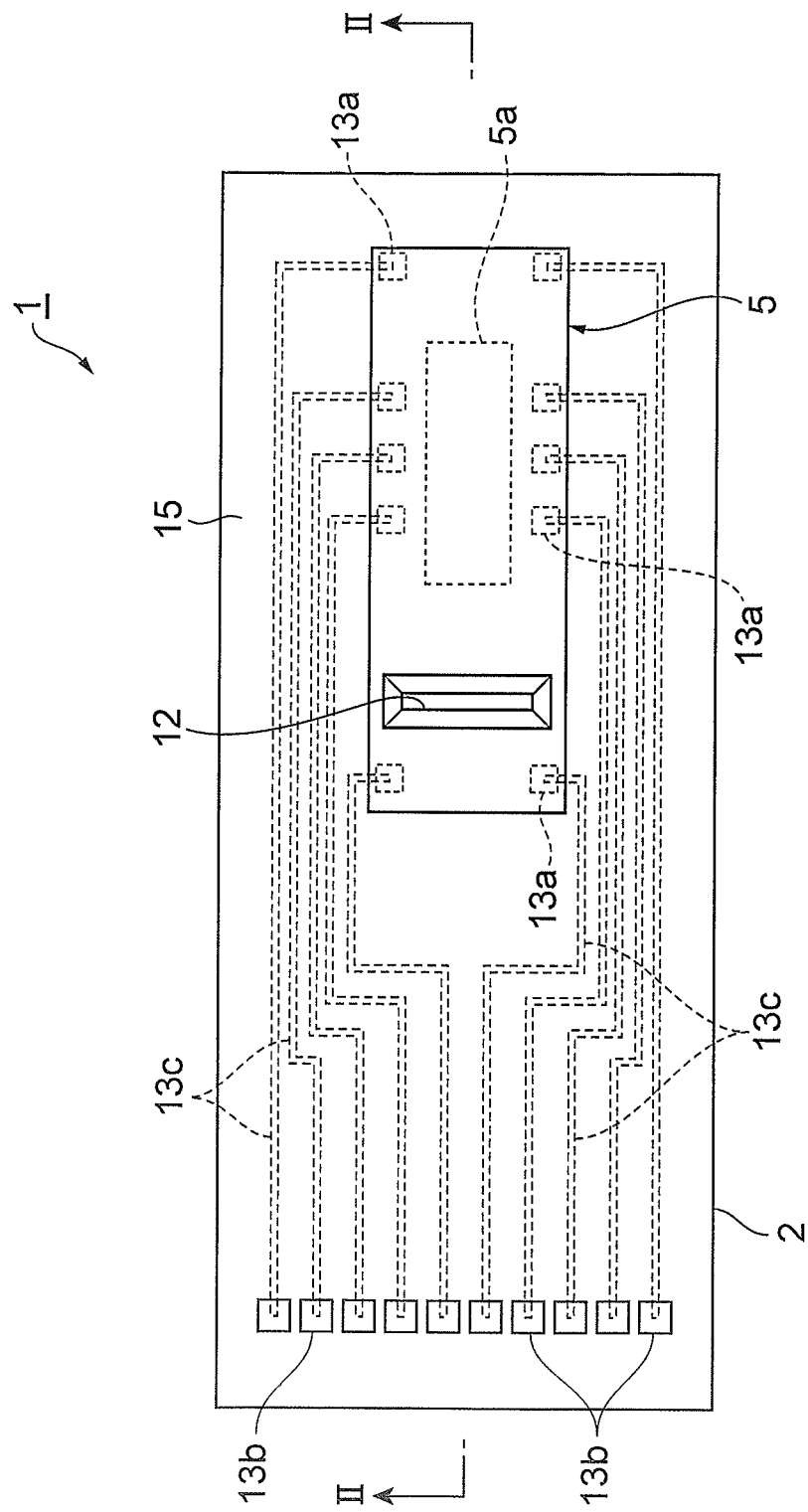
FIG. 1 is a plan view of an embodiment of the spectroscopic module in accordance with the present invention.

In the following, preferred embodiments of the present invention will be explained in detail with reference to the drawings. In the drawings, the same or equivalent parts will be referred to with the same signs while omitting their overlapping descriptions.

Figure 2:
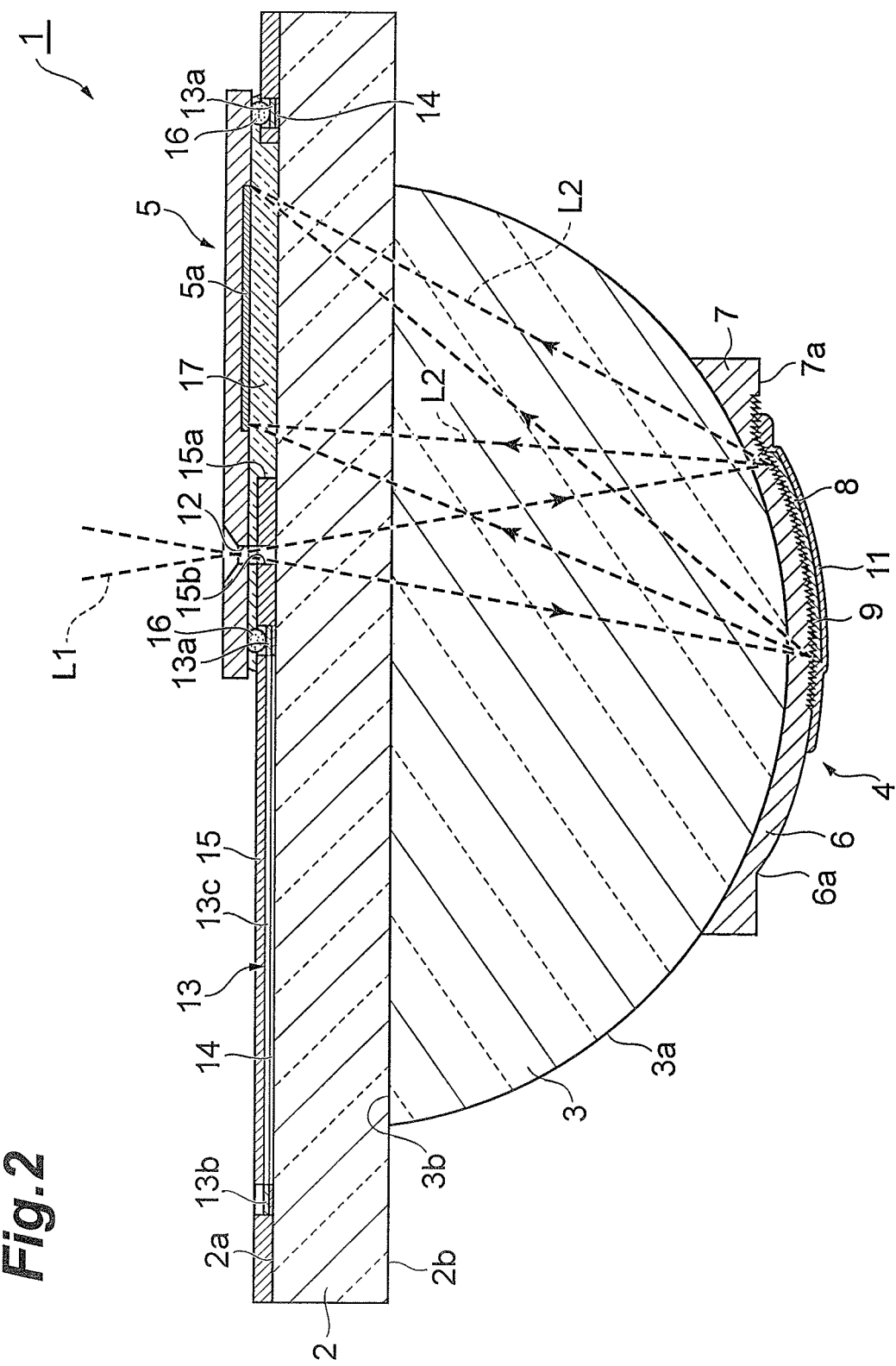
FIG. 2 is a sectional view taken along the line II-II of FIG. 1.

As illustrated in FIGS. 1 and 2, a spectroscopic module 1 comprises a substrate (main unit) 2 and a lens unit (main unit) 3 which transmit therethrough light L1, a spectroscopic unit 4 disposed on a curved surface 3a of the lens unit 3, and a photodetector 5 placed on a front face 2a of the substrate. The spectroscopic module 1 disperses the light L1 into a plurality of lights L2 by the spectroscopic unit 4 and detects the lights L2 by the photodetector 5, thereby measuring the wavelength distribution of the light L1, the intensity of a specific wavelength component thereof, and the like.

Figure 3:
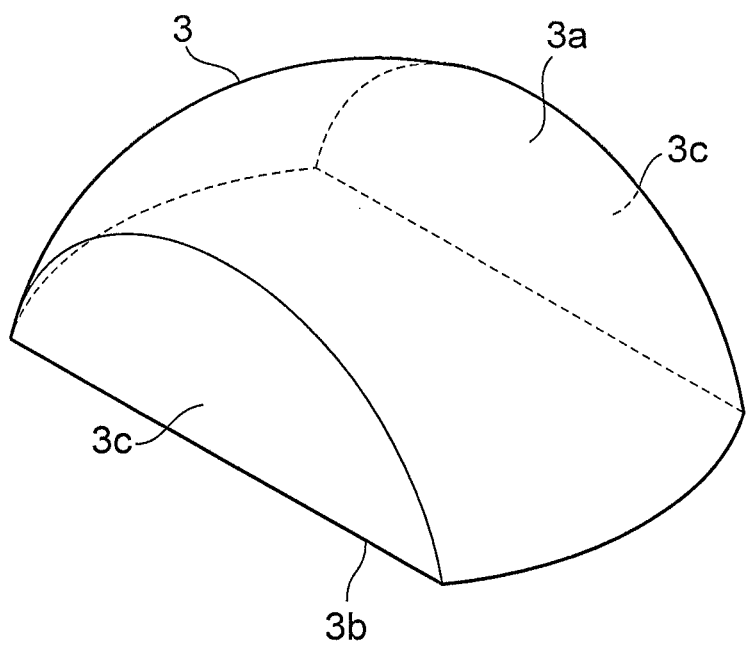
FIG. 3 is a perspective view of a lens unit in the spectroscopic module of FIG. 1.

The substrate 2 is formed like an oblong sheet from light-transmitting glass such as BK7, Pyrex (registered trademark), and silica; light-transmitting molded glass; light-transmitting plastic; or the like. The lens unit 3 is formed like a hemisphere from the same material as with the substrate 2, a light-transmitting resin, a light-transmitting inorganic/organic hybrid material, light-transmitting low-melting glass for molding a replica, or the like. More specifically, as illustrated in FIG. 3, the lens unit 3 has such a form that a hemispherical lens having the curved surface 3a and a front face 3b is cut off by two planes substantially perpendicular to the front face 3b and substantially parallel to each other, so as to yield side faces 3c. The light components L2 spectrally resolved by the spectroscopic unit 4 disposed on the curved surface 3a form images on a photodetection unit 5a of the photodetector 5.

As illustrated in FIGS. 1 and 2, the rear face 2b of the substrate 2 and the front face 3b of the lens unit 3 are joined to each other by an optical resin or direct bonding in a state where the longitudinal direction of the substrate 2 is substantially parallel to the side faces 3c of the lens unit 3. As a consequence, the substrate 2 and lens unit 3 transmit therethrough the light L1 incident thereon from the front side (one side of the main unit). The spectroscopic unit 4 is disposed on the convex curved surface 3a formed on the rear side of the substrate 2 and lens unit 3 (the other side of the main unit), while the photodetector 5 is placed on the front side of the substrate 2 and lens unit 3.

Figure 4:
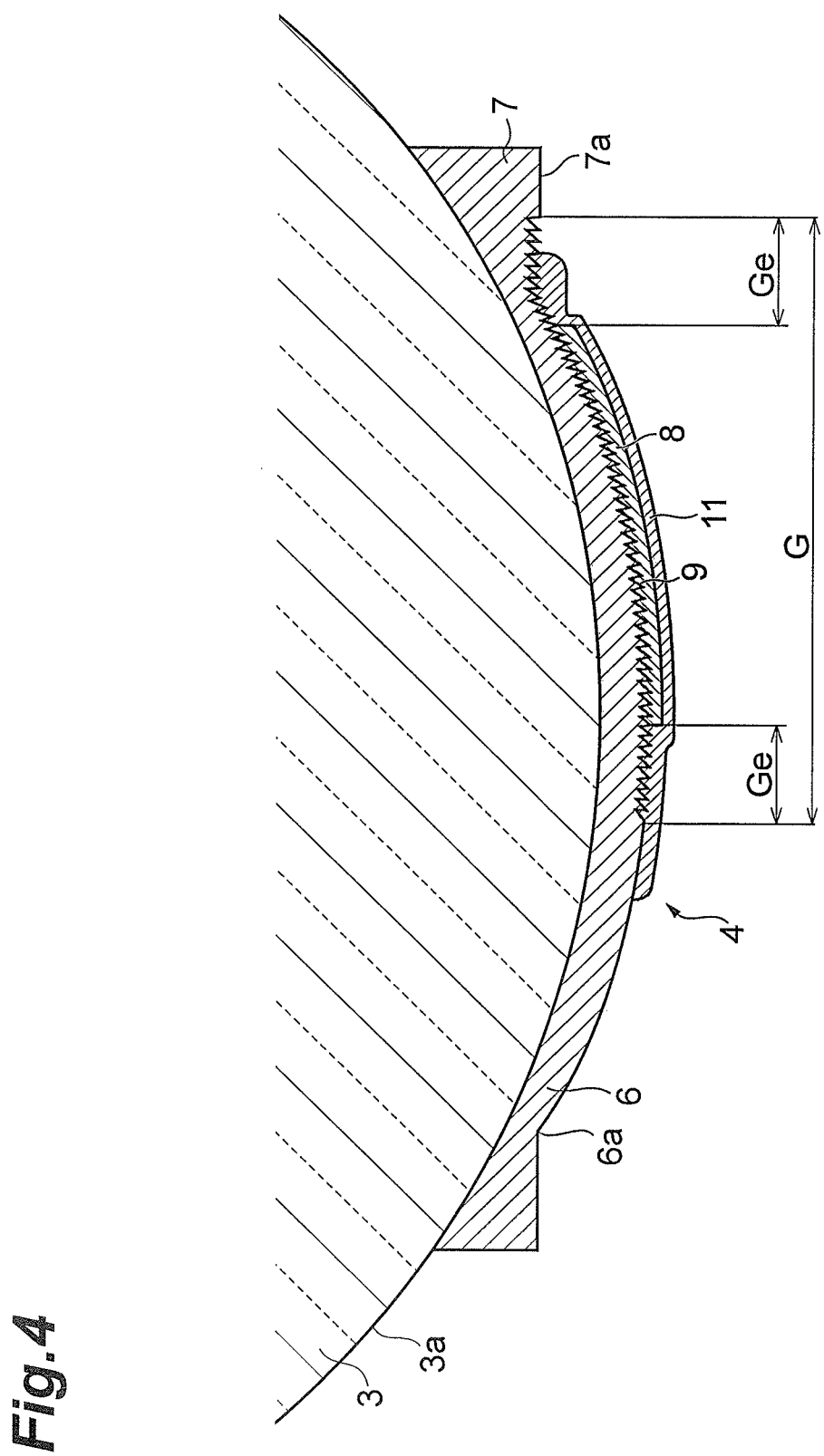
FIG. 4 is a sectional view of a spectroscopic unit in the spectroscopic module of FIG. 1.
Figure 5:
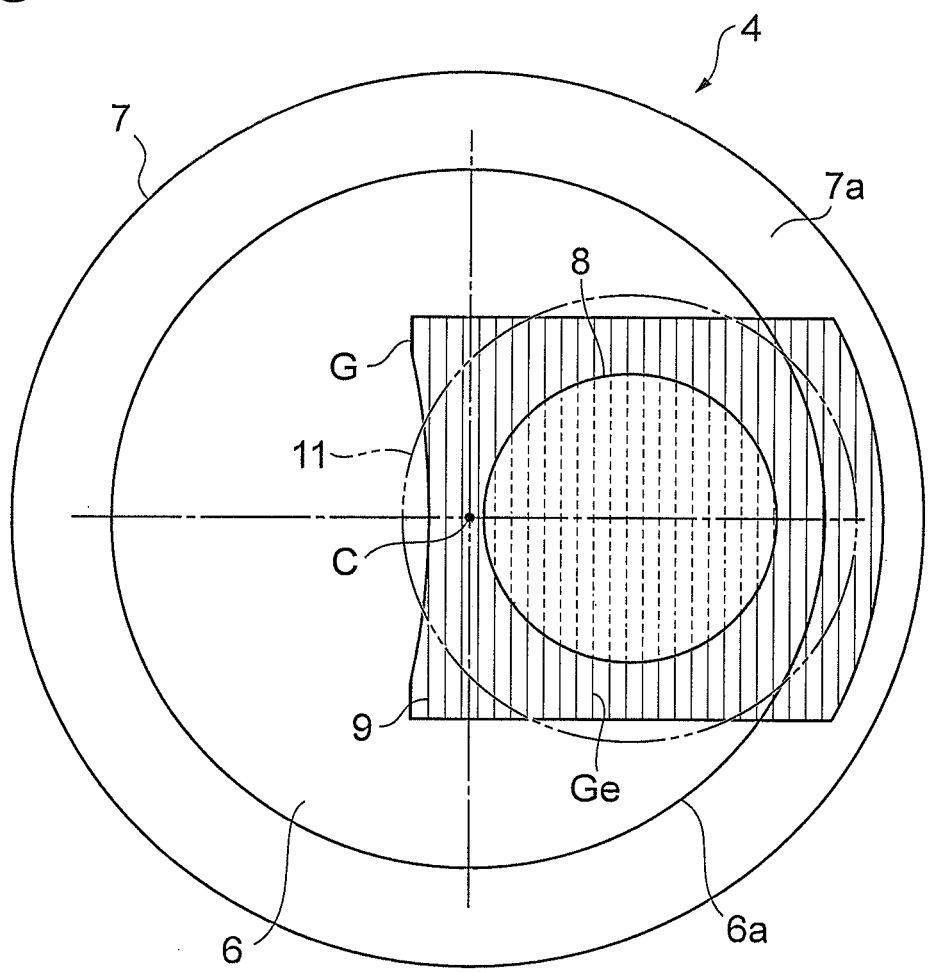
FIG. 5 is a bottom view of the spectroscopic unit in the spectroscopic module of FIG. 1.

The spectroscopic unit 4 is constructed as a reflection grating, which disperses the light L1 entering the substrate 2 and lens unit 3 and reflects the dispersed lights L2 to the front side. More specifically, as illustrated in FIGS. 4 and 5, the spectroscopic unit 4 has a diffraction layer 6 formed along the curved surface 3a, a flange 7 integrally formed with the diffraction layer 6 along a periphery 6a thereof so as to become thicker than the diffraction layer 6, and a reflection layer 8 formed on the surface on the outer side (rear side) of the diffraction layer 6.

The diffraction layer 6 is formed with a diffraction grating pattern 9. The diffraction grating pattern 9, examples of which include blazed gratings with a saw-toothed cross section, binary gratings with a rectangular cross section, and holographic gratings with a sinusoidal cross section, is constructed by arranging a plurality of grooves in parallel along the longitudinal direction of the substrate 2. The diffraction grating pattern 9 is arranged eccentric with respect to a center C of the diffraction layer 6 toward a predetermined side (one side in the longitudinal direction of the substrate 2 here). That is, the center (center of gravity) of the diffraction grating pattern 9 shifts from the center (center of gravity) of the diffraction layer 6 surrounded by the flange 7.

When seen from the rear side, the diffraction layer 6 and flange 7 are formed like a circle and a circular ring, respectively. When seen from the rear side, a region G formed with the diffraction grating pattern 9 has an oblong form and reaches over the rear face 7a of the flange 7 on the eccentric predetermined side. The reflection layer 8, which is formed like a circle when seen from the rear side, is included in the region G formed with the diffraction grating pattern 9. A circular protective layer 11 is formed on the outer (rear) surface of the diffraction layer 6 such as to contain and cover the reflection layer 8 when seen from the rear side.

For reference, the following is an example of sizes of the parts. The diffraction layer 6 has an outer diameter of 2 mm to 10 mm and a thickness of 1 μm to 20 μm, while the flange 7 has a width of 0.1 mm to 1 mm and a thickness of 10 μm to 500 μm. The reflection layer 8 has an outer diameter of 1 mm to 7 mm and a thickness of 10 nm to 2000 nm. The region G formed with the diffraction grating pattern 9 has a length of 1.5 mm to 8 mm on each side.

As illustrated in FIGS. 1 and 2, the photodetector 5 has the photodetection unit 5a for detecting the lights L2 spectrally resolved by the spectroscopic unit 4. The photodetection unit 5a is constructed by long photodiodes arranged one-dimensionally in a direction substantially perpendicular to the longitudinal direction thereof. The photodetector 5 is placed such that the one-dimensional arrangement direction of photodiodes substantially coincides with the longitudinal direction of the substrate 2, while the photodetection unit 5a faces the front face 2a of the substrate 2. The photodetector 5 may be a C-MOS image sensor, a CCD image sensor, or the like without being restricted to the photodiode array.

The photodetector 5 is provided with a light-transmitting aperture 12 for allowing the light L1 advancing to the spectroscopic unit 4 to enter the substrate 2 and lens unit 3. The light-transmitting aperture 12 is disposed in parallel with the photodetection unit 5a along the one-dimensional arrangement direction of photodiodes. The light-transmitting aperture 12, which is a slit extending in a direction substantially perpendicular to the longitudinal direction of the substrate 2 and substantially parallel to the front face 2a of the substrate 2, is formed by etching or the like while being aligned highly accurately with the photodetection unit 5a.

A wiring pattern 13 constituted by a monolayer film of Al, Au, or the like or a multilayer film of Cr—Pt—Au, Ti—Pt—Au, Ti—Ni—Au, Cr—Au, or the like is formed on the front face 2a of the substrate 2. The wiring pattern 13 has a plurality of pad units 13a, 13b and a plurality of connection units 13c for connecting their corresponding pad units 13a, 13b to each other. An antireflection layer 14 constituted by a monolayer of CrO or the like or a multilayer film of Cr—CrO or the like is formed on the front face 2a side of the substrate 2 with respect to the wiring pattern 13.

A light-absorbing layer 15 constituted by a monolayer film such as CrO, a multilayer film containing CrO or the like, a black resist, or the like is further formed on the front face 2a of the substrate 2. The light-absorbing layer 15 covers the connection units 13c of the wiring pattern 13 while exposing the pad units 13a, 13b thereof. The light-absorbing layer 15 is provided with a slit 15b for transmitting therethrough the light L1 advancing to the spectroscopic unit 4 and an opening 15a for transmitting therethrough the lights L2 proceeding to the photodetection unit 5a of the photodetector 5. The slit 15b opposes the light-transmitting aperture 12 of the photodetector 5, while the opening 15a opposes the photodetection unit 5a.

Outer terminals of the photodetector 5 are electrically connected by facedown bonding through bumps 16 to the pad units 13a exposed on the light-absorbing layer 15. An underfill material 17 which transmits therethrough at least the lights L2 is provided on the substrate 2 side of the photodetector 5 (between the photodetector 5 and the substrate 2 or light-absorbing layer 15 here). The underfill material 17 fills the whole space between the photodetector 5 and the substrate 2 in the depicted structure but may be provided only about the bumps 16. The pad units 13b exposed on the light-absorbing layer 15 function as outer terminals of the spectroscopic module 1. That is, external leads and the like are electrically connected to the pad units 13b exposed on the light-absorbing layer 15.

A method of manufacturing the above-mentioned spectroscopic module 1 will now be explained.

Figure 6:
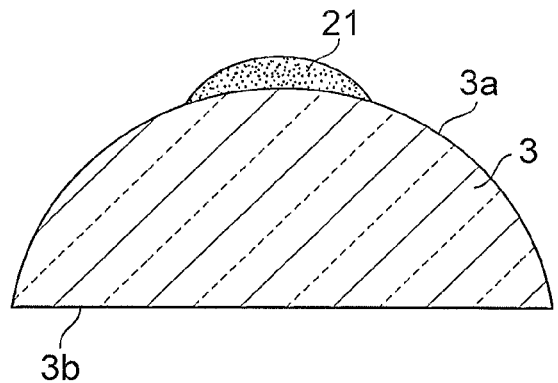
FIG. 6 is a set of diagrams for explaining an embodiment of the method of manufacturing a spectroscopic module in accordance with the present invention.
Figure 6:
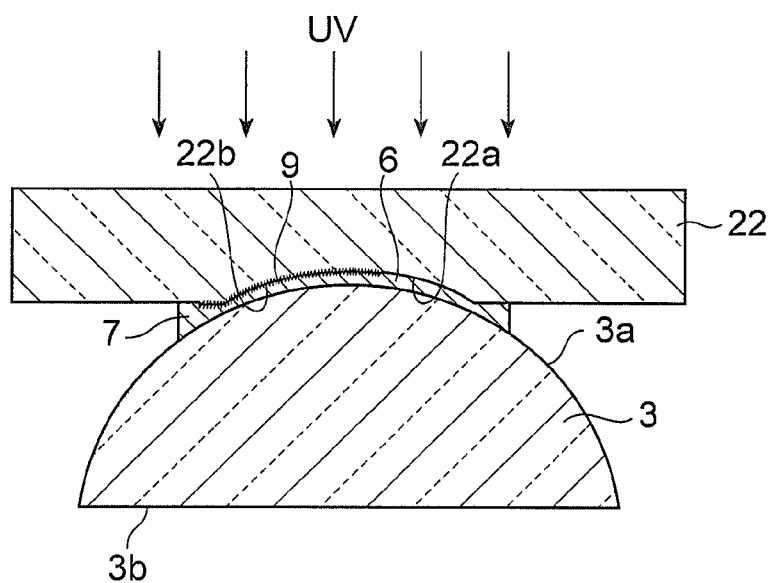
Figure 6:
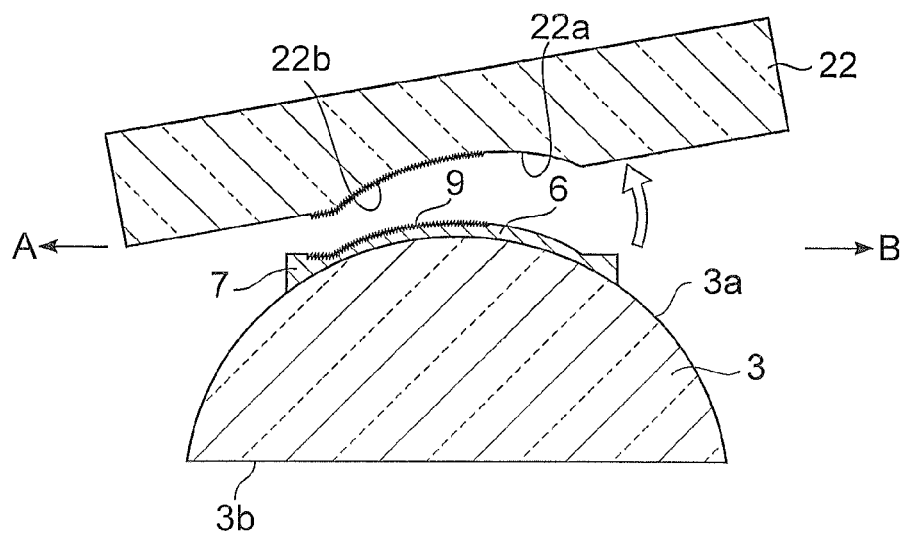

First, the lens unit 3 is formed with the spectroscopic unit 4. More specifically, as illustrated in FIG. 6(a), a photocurable optical resin material 21 for a replica made of an epoxy resin, an acrylic resin, an organic/inorganic hybrid resin, or the like, for example, is applied near the vertex portion of the curved surface 3a of the lens unit 3. Subsequently, as illustrated in FIG. 6(b), a light-transmitting master mold (mold) 22 made of silica or the like is pressed against the resin material 21. The master mold 22 is provided with a concave curved surface 22a having substantially the same curvature as with the curved surface 3a of the lens unit 3, while the concave curved surface 22a is formed with a plurality of grooves 22b corresponding to the diffraction grating pattern 9.

Then, as illustrated in FIG. 6(b), while the master mold 22 is pressed against the resin material 21, the latter is irradiated with ultraviolet rays UV through the master mold 22, so as to be cured, whereby the diffraction layer 6 provided with the diffraction grating pattern 9 and the flange 7 are formed integrally with each other.

Subsequently, as illustrated in FIG. 6(c), the master mold 22 is released from the resin material 21 earlier from the opposite side B than the predetermined side A toward which the diffraction grating pattern 9 is made eccentric in the diffraction layer 6. That is, the mold release from the diffraction grating pattern 9 exhibiting relatively higher adherence to the master mold 22 is relatively retarded. Preferably, heat curing is performed after releasing the mold, so as to stabilize the resin material 21.

Figure 7:
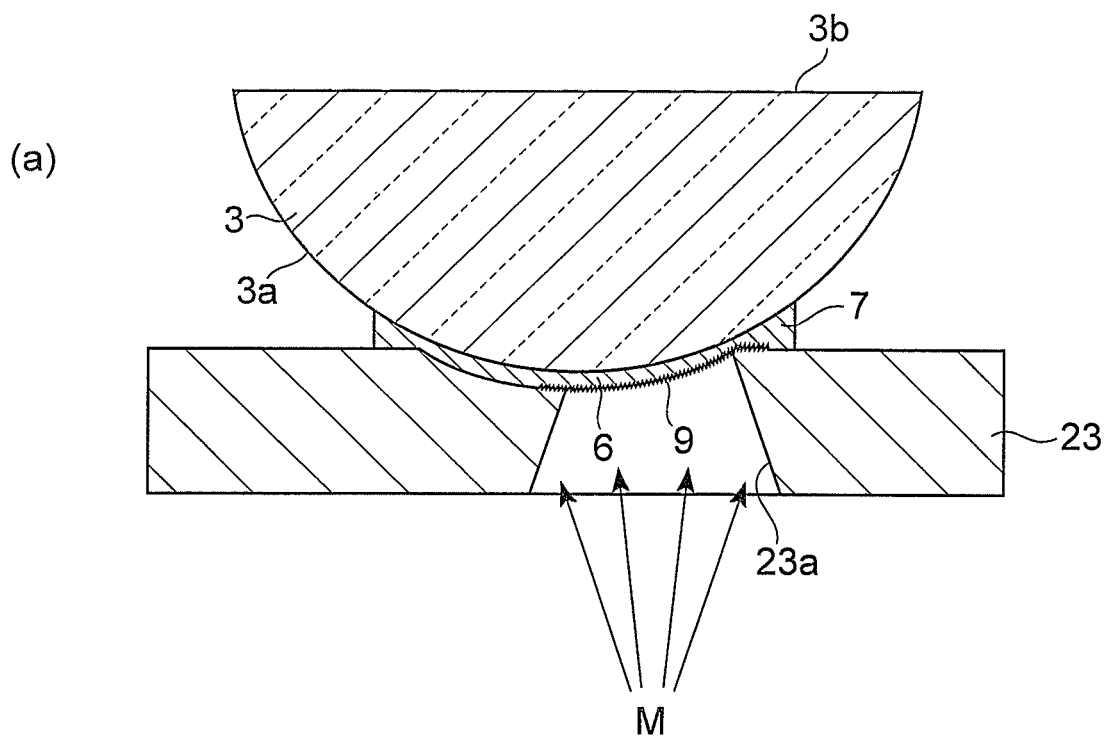
FIG. 7 is a set of diagrams for explaining the embodiment of the method of manufacturing a spectroscopic module in accordance with the present invention.
Figure 7:
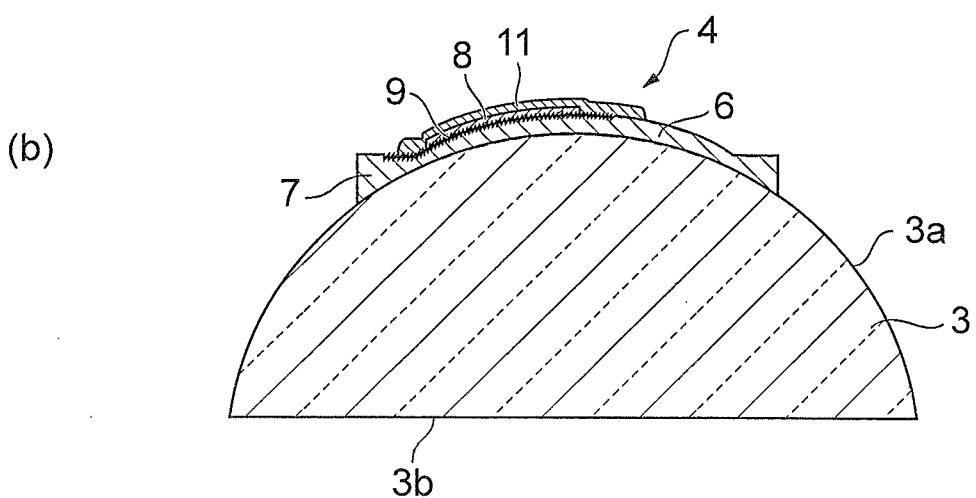

Next, as illustrated in FIG. 7(a), a metal M such as Al or Au is vapor-deposited in the predetermined region G within the diffraction grating pattern 9 through an opening 23a of a mask 23, so as to form the reflection layer 8 as a film. Then, as illustrated in FIG. 7(b), the protective layer 11, which is a passivation film, is formed so as to contain and cover the reflection layer 8, whereby the spectroscopic unit 4 is obtained.

While the spectroscopic unit 4 is formed as in the foregoing, the photodetector 5 is mounted to the substrate 2. More specifically, the antireflection layer 14 and the wiring pattern 13 are formed on the front face 2a of the substrate 2 by patterning, and the light-absorbing layer 15 is further formed on the whole surface and then patterned, so as to expose the pad units 13a, 13b and produce the slit 15b and opening 15a. Subsequently, the photodetector 5 is mounted by facedown bonding to the front face 2a of the substrate 2.

Then, while the spectroscopic unit 4 is aligned highly accurately with the photodetection unit 5a and light-transmitting aperture 12 of the photodetector 5, the rear face 2b of the substrate 2 mounted with the photodetector 5 and the front face 3b of the lens unit 3 formed with the spectroscopic unit 4 are joined to each other by an optical resin or direct bonding, so as to complete the spectroscopic module 1.

In the spectroscopic module 1 and the method of manufacturing the same, as explained in the foregoing, the flange 7 is formed integrally with the diffraction layer 6 along the periphery 6a thereof so as to become thicker than the diffraction layer 6. As a consequence, at the time of releasing the master mold 22 used for forming the diffraction layer 6 and flange 7, the diffraction layer 6 formed along the convex curved surface 3a of the main unit 3 can be prevented from peeling off from the curved surface 3a together with the master mold 22. The diffraction grating pattern 9 is formed so as to be eccentric with respect to the center C of the diffraction layer 6 toward a predetermined side. Therefore, releasing the mold earlier from the opposite side of the diffraction layer 6 than the predetermined side thereof (i.e., retarding the release from the diffraction grating pattern 9 exhibiting relatively higher adherence to the master mold 22) can prevent the diffraction layer 6 from peeling off and the diffraction grating pattern 9 from being damaged. Hence, this spectroscopic module 1 and the method of manufacturing the same can stabilize the forming of the diffraction grating pattern 9.

The fact that the diffraction grating pattern 9 exhibiting relatively higher adherence to the master mold 22 is formed only on a part of the diffraction layer 6 also contributes to making the master mold 22 smoother to release than when the diffraction grating pattern 9 is formed throughout the diffraction layer 6.

When forming the reflection layer 8 on the diffraction layer 6, positional deviations are likely to occur in the rotational direction of the mask 23 also because of the fact that the spectroscopic unit 4 is formed on the convex curved surface 3a of the main unit 3. If the reflection layer is formed so as to become substantially similar to the cross-sectional form of the light-transmitting aperture 12 of the photodetector 5 (e.g., an oblong form) here, positional deviations in the rotational direction will also occur in thus formed reflection layer, thereby yielding individual differences among thus manufactured spectroscopic modules. Since the reflection layer 8 is formed like a circle in the spectroscopic module 1, by contrast, the positional deviations in the rotational direction of the mask 23 are absorbed. This can reduce individual differences among the spectroscopic modules 1 and inhibit sensitivity from fluctuating.

The reflection layer 8 is formed so as to be included in the region G formed with the diffraction grating pattern 9. In this case, no reflection layer 8 exists in a region free of the diffraction grating pattern 9 in the diffraction layer 6, whereby light having reached the region free of the diffraction grating pattern 9 can be restrained from being reflected into the substrate 2 and lens unit 3 so as to be detected by the photodetector 5 or become stray light without being dispersed. In addition, light having reached a region Ge which is free of the reflection layer 8 in the region G formed with the diffraction grating pattern 9 is reflected while being slightly dispersed, so as to be detected by the photodetector 5, whereby the sensitivity can be improved.

The protective layer 11 is formed on the diffraction layer 6 so as to contain and cover the reflection layer 8. This allows the protective layer 11 to come into contact with the region Ge free of the reflection layer 8 in the region G formed with the diffraction grating pattern 9, whereby an anchor effect can prevent the protective layer 11 from peeling off from the diffraction layer 6.

The diffraction grating pattern 9 reaches over the rear face 7a of the flange 7 on the predetermined side, thereby making it possible to form the diffraction layer 6 with the diffraction grating pattern 9 accurately up to the boundary with the flange 7 on the predetermined side. This also makes it possible to inspect the state of the diffraction grating pattern 9 easily on the rear face 7a of the flange 7.

Providing the spectroscopic unit 4 on the convex curved surface 3a makes it possible to form the diffraction layer 6 very thin, e.g., by a thickness of 1 μm to 20 μm. This can suppress the light absorption in the diffraction layer 6, thereby improving the light utilization efficiency. Forming the diffraction layer 6 very thin can also inhibit the diffraction layer 6 from being deformed (expanded/shrunk and so forth) by heat and moisture, thereby securing stable spectral characteristics and high reliability. On the other hand, providing the spectroscopic unit 4 on the convex curved surface 3a can make the flange 7 thicker than the diffraction layer 6 reliably and easily, thereby preventing the diffraction layer 6 from peeling off from the curved surface 3a.

The present invention is not limited to the above-mentioned embodiments. For example, the convex curved surface provided with the spectroscopic unit may be a curved surface other than spherical surfaces. The substrate 2 and the lens unit 3 may be formed integrally with each other. A photodetector having no light-transmitting aperture may be employed, such that the light L1 enters from the slit 15b of the light-absorbing layer 15, for example.

INDUSTRIAL APPLICABILITY

The present invention can stabilize the forming of a diffraction grating pattern.

REFERENCE SIGNS LIST

1 . . . spectroscopic module; 2 . . . substrate (main unit); 3 . . . lens unit (main unit); 3a . . . curved surface; 4 . . . spectroscopic unit; 5 . . . photodetector; 6 . . . diffraction layer; 6a . . . periphery; 7 . . . flange; 8 . . . reflection layer; 9 . . . diffraction grating pattern; 11 . . . protective layer; 21 . . . resin material; 22 . . . master mold

The invention claimed is:

1. A spectroscopic unit comprising:
a member having a curved surface;
a first layer formed along the curved surface, the first layer being provided with a diffraction grating pattern;
a second layer formed on a surface of the first layer, the second layer for reflecting incident light; and
wherein the diffraction grating pattern is arranged eccentric with respect to a center of the first layer toward a predetermined side.

2. A spectroscopic unit according to claim 1, wherein the second layer has a circular circumference.

3. A spectroscopic unit according to claim 1, wherein the second layer is formed so as to be included in a region formed with the diffraction grating pattern.

4. A spectroscopic unit according to claim 3, wherein a protective layer is formed on the other side of the first layer so as to contain and cover the second layer.

5. A spectroscopic unit according to claim 1, wherein the diffraction grating pattern is arranged eccentric with respect to the center of the first layer in a direction, grooves of the diffraction grating pattern being arranged along the direction.

6. A spectroscopic unit according to claim 5, wherein a line passing through both a center of the diffraction grating pattern and the center of the first layer is parallel to the direction.

7. A spectroscopic unit according to claim 1, wherein a line passing through both a center of the diffraction grating pattern and the center of the first layer is parallel to a direction, grooves of the diffraction grating pattern being arranged along the direction.

8. A method of manufacturing the spectroscopic unit according to claim 1, the method comprising the steps of:
mounting a resin material on the curved surface of the member;
pressing a mold against the resin material and curing the resin material so as to form the first layer provided with the diffraction grating pattern; and
releasing the mold from the resin material on a side opposite to the predetermined side before releasing the mold from the resin material on the predetermined side.

* * * * *